A. W. HALL.
APPARATUS FOR THE MANUFACTURE OF ILLUMINATING GAS.
No. 109,510. Patented Nov. 22, 1870.
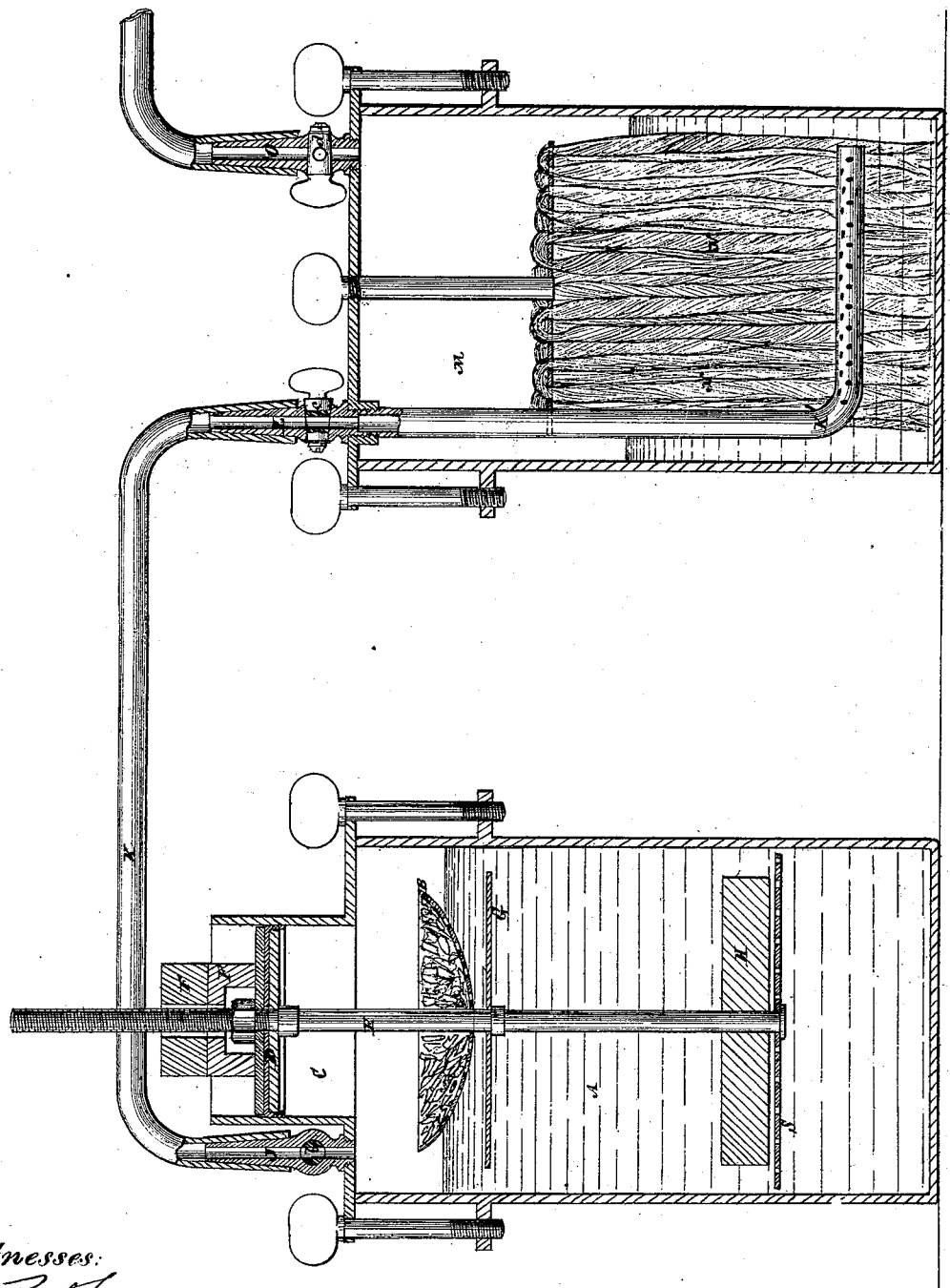

United States Patent Office.

ALEXANDER W. HALL, OF NEW YORK, N. Y., ASSIGNOR TO HIMSELF AND EDWIN R. WARREN, OF SAME PLACE.

Letters Patent No. 109,510, dated November 22, 1870; antedated November 11, 1870.

IMPROVEMENT IN APPARATUS FOR THE MANUFACTURE OF ILLUMINATING-GAS.

The Schedule referred to in these Letters Patent and making part of the same.

*To all whom it may concern:*

Be it known that I, ALEXANDER W. HALL, of the city, county, and State of New York, have invented a new and useful Improvement in Apparatus for the Manufacture of Illuminating-Gas, of which the following is a full, clear, and exact description, reference being had to the accompanying drawing forming part of this specification, and which represents a sectional elevation of my improved apparatus.

My invention relates to apparatus for the manufacture of illuminating-gas, in which hydrogen-gas is generated by the reaction of a suitable dilute acid upon scrap metal contained within a perforated basket, and said gas afterward carbureted by being brought in contact with gasoline or other hydrocarbon-liquid, such apparatus being automatic in its action as regards the exposure of the scrap in the basket to the acid accordingly as it is required to generate gas.

The invention consists in a novel combination of devices, as applied to apparatus of the description referred to, including a guard, arranged below the perforated basket for catching scrap falling through the perforations in the basket by the reducing action of the acid, and which, if allowed to fall into the acid in the chamber in which the basket is exposed, would continue to generate gas, and endanger explosion, after the basket had been drawn up out of the acid.

The invention likewise includes a loaded piston, applied to regulate, by pressure of the gas on it, the depth of the basket's immersion in the acid, according to the amount or pressure of gas required to be generated; also, a float immersed in the acid, and connected with the basket and piston, to aid in supporting them; likewise, a submerged agitator, operated by the rise and fall of the basket, to keep the acid in the gas-generating chamber well mixed.

The invention furthermore comprises a novel combination or arrangement of devices for carbureting the gas after leaving the generator, and in its way to the exit-pipe, including a perforated lower escape-pipe for the hydrogen relatively to a series of wicks that operate by capillary attraction to hold in suspension the hydrocarbon-liquid.

Referring to the accompanying drawing—

A represents the vessel or chamber in which the dilute sulphuric or other suitable acid for generating the gas is contained.

B is the perforated basket for holding the metal scrap on which the acid is required to act.

This basket may have the scrap supplied to it through any suitable opening arranged in the upper portion of the vessel A, and made capable of being closed when required.

Similar provision should be made for filling or replenishing the vessel A with acid, and a gauge-cock be attached to regulate the proper level of the acid therein.

Mounted on the vessel A is a cylinder, C, open at its bottom to said vessel, and having arranged within it a piston, D, fitted with a cup-leather packing, and made fast, preferably in an adjustable manner, to a vertical rod, E, on which the basket B is secured.

Thus arranged, the piston D, which is loaded to any required extent by removable weights F, serves, by the pressure of the gas on its under surface, to regulate the immersion of the basket in the acid, giving a deeper immersion when a heavy load is put on, which causes a more rapid generation of gas, and reducing the immersion of the basket, or altogether lifting it out of the acid, when taking off weight from the piston to diminish or arrest the generation of gas.

A piston thus applied to the basket forms a much simpler, more compact, and less expensive contrivance than a gas-holder working in an outer vessel supplied with water, as heretofore used for the same purpose.

Arranged below the basket, and fast to the rod E, is a guard, G, of plate-like form, to catch scrap reduced by the acid and falling through the basket, whereby said scrap is prevented from settling in the acid-chamber to continue the generation of gas after the basket has been raised out of the acid, and is raised, in common with the scrap in the basket, free from further exposure to the acid, thus relieving the apparatus from the danger of explosion by the untimely or excessive generation of gas.

Said guard G is of a close plate construction, to prevent scrap, as eaten away by the acid, from passing through it, and to allow of acid running from off it back into the main body of acid below, after said guard and basket have been raised out of the liquid.

H is a submerged float, attached to the rod E, to support or balance, by its buoyancy in the acid, the piston and basket, with its contents and guard, the weights F serving to sink or lower the same, as required, when generating gas.

In place of this float, outside counterbalance weights may be applied to the piston, as the same have been applied to the gas-holder of gasometers to produce the same effect as the float; but it is preferred to use the latter, as being out of the way, simpler, and more compact.

Attached also to the rod E is a submerged agitator, S, formed by a perforated plate, which, as the basket rises and falls in the acid, serves to keep up a mixing action of the lower and denser grades of the dilute acid with its upper and lighter grades, thus equalizing the strength of the whole volume of acid, and making it available on the metal scrap in the basket.

J is the exit-nozzle for the hydrogen-gas to pass off, by a connecting-pipe, K, through the receiving-nozzle L of the carbureter, on opening cocks *b* and *c* for the purpose.

M is the carbureting-chamber, down within which an escape-pipe, K', for the hydrogen-gas, is arranged, and made to connect with the receiving-nozzle L, to conduct said gas, as it comes from the vessel A, into the lower portion of the carbureting-chamber M.

This escape-pipe K' is bent, to form a horizontal arm below, and perforated, to effect a more perfect distribution of the hydrogen through the hydrocarbon-liquid in the chamber M, and, in its upward course, through or among a series of suspended wicks, N, which act, by capillary attraction, to draw up the liquid, and, by the exposure of their saturated surfaces, to aid materially, as in other applications of wick for the like purpose, in effecting the carbureting of the gas.

The perforated escape-pipe K', and the arrangement of its lower perforated arm relatively to the chamber M and the wicks N, have an important bearing in this relation.

O is the exit-nozzle, fitted with a cock, *d*, for the carbureted gas, said nozzle having a hose or pipe attached to it for conveying the gas to the place where it is required to be used.

What is here claimed, and desired to be secured by Letters Patent, is—

1. The combination of the guard G with the perforated basket B, arranged in relation to each other for operation within the acid-chamber A, substantially as specified.

2. The combination of the piston D and cylinder C with the basket B and its guard G, essentially as described.

3. The float H, in combination with the basket B, the guard G, and piston D, substantially as specified.

4. The combination of the submerged agitator S with the basket B, essentially as herein set forth.

5. The combination, with the gas-generating chamber A and pipe K, which conveys the gas to the carbureter, of the perforated escape-pipe K', bent as described, and arranged in relation to the carbureting-chamber M and wicks N, suspended therein, substantially as specified.

A. W. HALL.

Witnesses:
FRED. HAYNES,
J. C. LAWRENCE.